United States Patent [19]

McGowan, Jr. et al.

[11] Patent Number: 5,704,391
[45] Date of Patent: Jan. 6, 1998

[54] GRAVITY-OPERATED GAS SHUT-OFF VALVE

[75] Inventors: John B. McGowan, Jr., Malvern; Joseph M. McGinnis, West Chester, both of Pa.

[73] Assignee: UMAC Incorporated, Exton, Pa.

[21] Appl. No.: 389,417

[22] Filed: Feb. 16, 1995

[51] Int. Cl.$^6$ ............................................. F16K 17/28
[52] U.S. Cl. ............................ 137/454.2; 137/513.5; 137/517
[58] Field of Search ................... 137/517, 519, 137/454.2, 462, 513.5

[56] References Cited

U.S. PATENT DOCUMENTS

| | | |
|---|---|---|
| 1,959,043 | 5/1934 | Todd . |
| 2,185,173 | 1/1940 | Fortune ........................... 137/519 X |
| 2,241,573 | 5/1941 | Aschenbach . |
| 2,726,673 | 12/1955 | Russell . |
| 2,771,091 | 11/1956 | Baker et al. ..................... 137/454.2 X |
| 2,827,922 | 3/1958 | Guinard . |
| 3,164,141 | 1/1965 | Jones . |
| 3,183,924 | 5/1965 | Duchin . |
| 3,276,446 | 10/1966 | Hay . |
| 3,356,104 | 12/1967 | Caralizo ............................ 137/519 |
| 3,735,777 | 5/1973 | Katzer et al. ................... 137/517 X |
| 3,918,481 | 11/1975 | Doe et al. ........................... 137/504 |
| 3,941,145 | 3/1976 | Morain et al. ................... 137/460 X |
| 4,128,105 | 12/1978 | Follett ............................. 137/519 X |
| 4,492,249 | 1/1985 | Arino et al. ................... 137/454.2 X |
| 4,643,222 | 2/1987 | Wiser . |
| 4,660,803 | 4/1987 | Johnston et al. . |
| 4,683,910 | 8/1987 | Benson et al. . |
| 4,784,175 | 11/1988 | Hicks . |
| 4,787,416 | 11/1988 | Chuang . |
| 4,880,030 | 11/1989 | Terry ................................ 137/462 X |
| 4,958,657 | 9/1990 | Hagan et al. ................... 137/513.5 |
| 5,141,023 | 8/1992 | Dollison et al. ................ 137/519 X |
| 5,295,534 | 3/1994 | Porter .............................. 137/462 |

OTHER PUBLICATIONS

Donkin Flow Limitors Offer Service Line Safety, Service Line Theft Protection, Plus Automatic Shut–off for Maintenance Labor Savings—Standard Donkin Flow Limitor—Low Pressure Donkin Flow Limitor.

UMAC Self–Actuating Gas Service Line Shut Off Valves—Excess Flow Valves UMAC Incorporated, 120 South Ship Road, Exton, PA 19341.

*Primary Examiner*—Stephen M. Hepperle
*Attorney, Agent, or Firm*—Browdy and Neimark

[57] ABSTRACT

A flow shut-off valve shuts off natural gas if there is a break in a gas line, for example, the line to a water heater toppled by an earthquake. The shut-off valve is fitted into a standard pipe nipple that is installed in a vertical position. The shut-off valve includes a plastic float having a tapered nose with a O-ring in a groove at the base of the nose, a flow-restricting orifice region, and guide fins at the lower end of the float to guide it along the bore of a plastic body having a bore and shoulders at either end to contain the float. The body includes an conical aperture at the upper end into which the float nose and the O-ring are inserted when a break occurs and the downstream pressure drops, forcing the float upward as the gas flow surges. No spring is used; the balance of gravity and gas=flow forces controls the operation of the shut-off valve. The body is spin-welded from two pieces and crimped into position in the nipple.

23 Claims, 3 Drawing Sheets

GRAVITY-OPERATED GAS SHUT-OFF VALVE

FIELD OF THE INVENTION

The present invention relates to safety devices, and more particularly to pipeline flow shut-off valves, especially those intended for natural gas lines or other pipelines carrying dangerous substances.

BACKGROUND OF THE INVENTION

Flow limiting devices, or limiter valves, are used in the natural gas industry as a safety measure to prevent explosive gases such as natural gas, propane, methane town gas, etc. from escaping when a pipe is ruptured. Limiter valves are special valves that are installed in the gas lines. A limiter valve will remain open during normal use, when there is back pressure downstream from the limiter valve, but will trip (snap shut) when the downstream pressure disappears, e.g. due to a pipe rupture downstream. The closure of such a valve prevents fires and explosions when lines are ruptured. Some limiter valves are designed to not shut off the flow completely when the valve is tripped; instead, a small controlled leakage flow is allowed through the limiter valve to re-pressurize the line after the break is repaired.

The basic idea of small controlled leakage is presented in U.S. Pat. No. 3,918,481, issued to Doe et al. The Doe patent shows a limiter comprised of a hollow valve body with a movable valve head (or float) 22 inside. At the upstream end, where gas enters the valve, is an insert 12 with a circular edge which acts as a seat for the float 22; flutes 28 create gaps between the float and the insert 12, allowing the float to remain seated during normal gas flows. A coil spring 20 pushes the float against the insert.

When the flow is greater the float is pushed downstream and the force of the coil spring is overcome. At the downstream end of the float is a long stem 24, integral with the float, which is inserted into the smaller open end of a conical insert 14. The stem diameter varies with the distance from the valve body; as the float is pushed downstream by the flow of gas, the stem's cross-sectional area variation affects the flow of gas through an annular space 38 between the stem and an insert 14, but does not introduce appreciable pressure drop. (See the Doe '481 patent at col. 1, line 45; col. 2, lines 40–62; and claim 2.)

To re-pressurize with a small flow, Doe employs a transverse slot 32 (FIG. 2) in the special washer 26. The washer 26 is apparently a sealing member, but it can not be resilient because, if it were, the spring 20 would deform it, closing the slot 32 and allowing the washer to fall into the inside of the spring 20.

The basic Doe design is employed by UMAC EXCESS FLOW valves, described in a brochure of UMAC, Inc., entitled "Self-actuating gas service line shut off valves," copyrighted March 1993. This brochure shows the Doe-type valves installed underground and connected to a gas meter, within a short section of pipe threaded at one end. The valve is installed on the upstream side of the gas meter.

U.S. Pat. No. 4,958,657, to Hagan et al., dated Sept. 25, 1990 and assigned to UMAC, Inc., shows a gas-line flow restrictor comprising a cylindrical pipe or bore within which a valve head member (float) 24 is free to move. The float 24 has a tapered nose 26 which closes against a circular edge to shut down the gas flow when the valve is tripped; a coil spring holds the float away when the flow is under the trip value, and the device operates well at gas pressures of 5 psi and higher and high flow volumes of, for example, 2000–2600 ft³/hr. To limit the upstream travel of the float, an annular step 32 acts as a stop for guiding fins 30 of the sliding valve head 24. The cruciform fins 30 guide the float along the bore and allow gas to pass by. The upstream side of the float is not tapered or streamlined. The body or shell has a uniform outside diameter for placement inside a pipe (col. 3, line 35). Among the differences between the Hagen and Doe devices is that the respective conical noses point in opposite directions: Hagan's points downstream, Doe's points upstream.

The Hagan device has a small bleed notch 42 on the float, as seen in FIG. 2. This allows the downstream line to re-pressurize as explained above.

A brochure entitled, "Donkin Flow Limitors Offer Service Line Safety, . . . Labor Savings" depicts a "Standard Donkin Flow Limitor" which appears to embody the Doe device, and also a "Low Pressure Donkin Flow Limitor" which comprises a ball trapped within a cylindrical space by a cross-wire or cross bar. The ball apparently is raised against a seat by high gas flow rates to shut off the flow of gas.

Such prior art devices with the exception of the "Low Pressure Donkin Flow Limitor", are intended primarily for relatively high pressure, high flow gas lines. Their purpose is to limit pipeline flow when damage occurs upstream of the gas meter, for example, pipeline damage due to digging outside the consumer's residence or business. Such gas line flow valves are typically buried or otherwise inaccessible to the homeowner. Because of this it is desirable that such valves automatically reset themselves after the break is repaired, and the aforementioned bleed-by feature is highly desirable.

There is a need, which has not been met by the prior art, for a gas flow shut-off valve which can be installed in consumers' homes and businesses downstream from gas company fittings to provide extra safety in the event of damage caused by earthquakes, explosions, or similar events at the consumer's end of the gas line. One example of such an event is that water heaters may be knocked over by an earthquake, breaking the gas line to the water heater and releasing explosive gas into the confined space in which the water heater is installed. During the San Francisco area earthquake of 1989, several hundred water heaters were knocked over causing rupture of domestic and commercial gas lines, with the dangerous release of gas. No relatively inexpensive system is presently available to solve this problem at the consumer level.

SUMMARY OF THE INVENTION

Accordingly, the present invention has an object, among others, to overcome deficiencies in the prior art such as noted above.

Another object is to provide a relatively inexpensive safety shut-off valve which can be easily installed at the consumer level and will operate at low gas pressures and flow rates.

The invention thus is intended primarily for use in residences and businesses, generally installed at the outlet location of the gas company meter outside the foundation wall into the customer's piping system. The invention is incorporated into for example a ¾" or 1" pipe nipple having standard threads, which can easily be mounted into a consumer's gas line and easily replaced or reset following an occasional event that requires the flow to be stopped. The device of the present invention, has no provision for small leakage flow; rather, it is intended to thoroughly shut off any gas flow and is not intended to automatically reset itself. However, the device may optionally employ a small controlled leakage flow used to automatically reset the shut-off value. This device is operated by gravity and the valve head or float must be oriented to a vertical position in use, and has a definite upper end and lower end.

The flow shut-off valve has one moving part, a float, which is slidably held within a bore formed in a valve body. Both the float and the body are preferably made of an engineering-grade plastic, such as acetal resin. The valve body is cylindrical on the outside surface and the steel nipple is crimped to hold it in place. At the upstream end of the bore (that is, the bottom end of the shut-off valve) is an aperture to allow gas to flow upwardly into the bore, and an internal step or flange which prevents the float from falling out of the valve body. At the upper (downstream) end is a second internal step which stops the float's upward motion.

The float includes a guide region at the bottom end which maintains the float in concentric and axial alignment within the bore. Preferably the guides are longitudinal fin-like projections similar to the device of the Hagen patent. The effective outside diameter of the float fins is slightly less (eg., 0.005 inch) than the inside diameter of the bore so that the float may easily slide up and down within the bore, without binding. The fins allow the gas to flow easily between them and past the guide region.

Directly above the guide region is an orifice portion of the float, which restricts gas flow so that upward flow of gas will exert a force on the float tending to lift it up. The orifice portion may be a disc-like part of the float having a diameter less than the bore, with the exact dimensions being selected for the gas, the flow rate, and other variables.

The upper end of the plastic valve body includes a diffuser portion having an aperture. The aperture acts as a valve seat when the float is pushed upward by upstream gas pressure to shut off the gas flow. The interior surface of the diffuser is in shape a the frustum of a cone. Just below the conical surface is a short cylindrical bore (eg., 0.100"long) slightly greater in diameter than nose of the float so that the nose can enter it, but it interferes with an O-ring which is snapped into a groove around the bottom of the float nose. When the float rises, the O-ring is trapped between the groove in the float and the aperture. The O-ring seals tightly against gas leakage.

Because of the snug fit, the float will generally not fall out when pressure is released if the initial seating pressure was high enough to force it into the aperture (about 2–5 psig). However, the float can easily be pushed from the diffuser by inserting an elongated object, eg., a pen or pencil, through the top end of the diffuser.

The float includes a shoulder which bears against a mating shoulder at the upper end of the bore, to stop the upward motion of the float. This prevents the nose of the float from being jammed into the aperture. The circumferential groove is directly above the shoulder. The conical portion of the nose acts both to streamline gas flow and also to ensure that the O-ring engages the inner surface of the diffuser when the float is pushed upward to seal off the gas.

The plastic valve body is preferably formed in two pieces, a lower body including the bore and an upper or diffuser body which contains the conical valve seating bore. The two parts are spun-welded together to form them into a single unit.

BRIEF DESCRIPTION OF THE DRAWING

The above objects and the nature and advantages of the present invention will become more apparent from the following detailed description of embodiment(s) taken in conjunction with the drawing wherein.

DETAILED DESCRIPTION OF THE PREFERRED EMBODIMENTS

Figure 1:
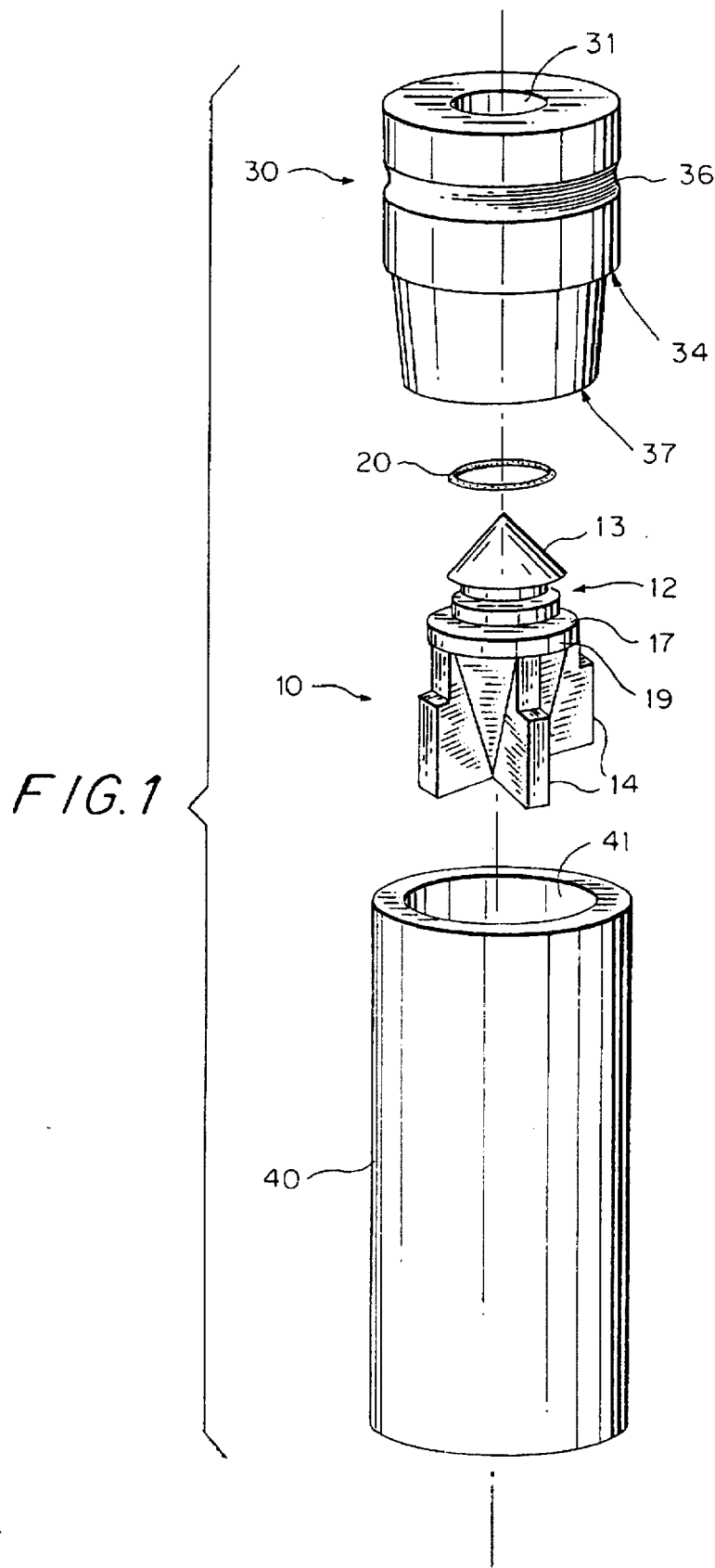
FIG. 1 is an exploded perspective view of an embodiment of the present invention, showing the lower and upper portions of the body separated.
Figure 2:
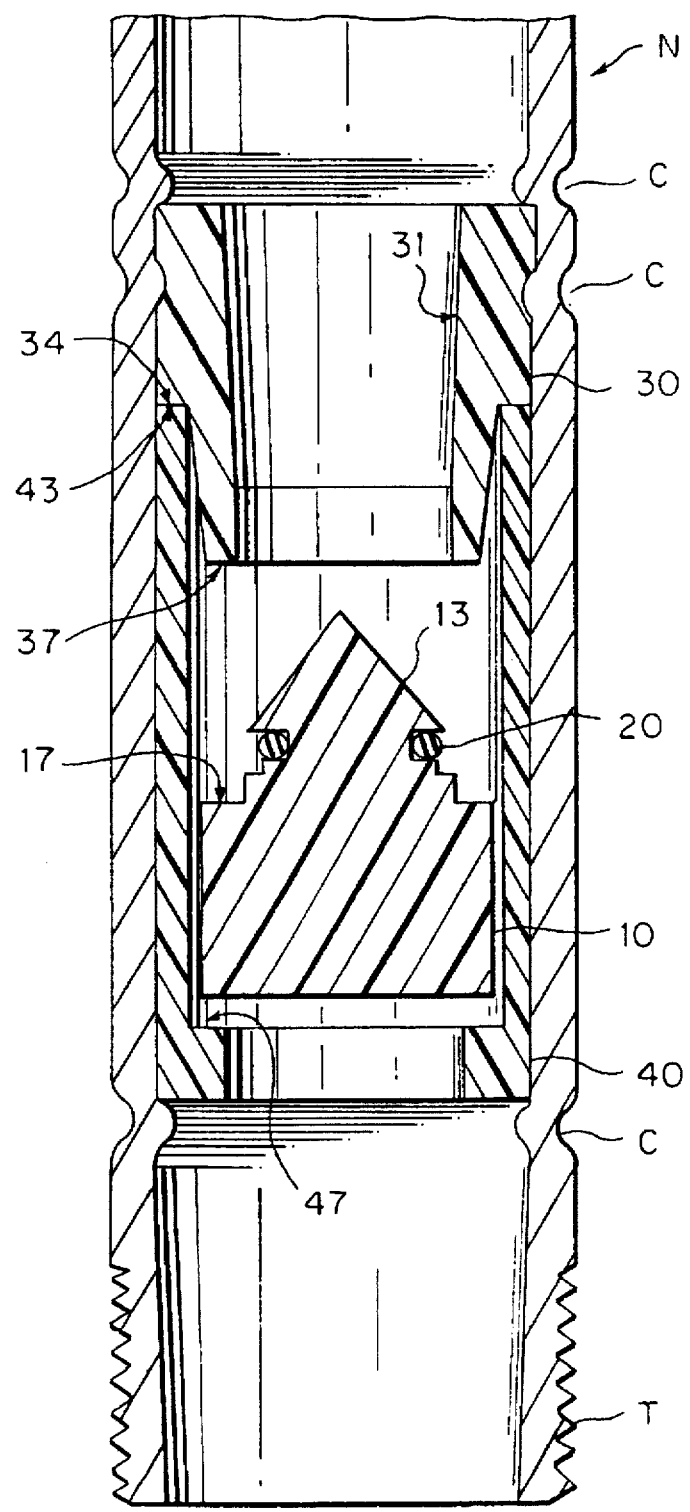
FIG. 2 is a cross-sectional view of the device of FIG. 1, installed in a standard pipe nipple.

FIG. 1 shows the parts of the present invention, a flow shut-off valve for natural gas lines, in exploded view. FIG. 2 shows the parts of FIG. 1 assembled for use and mounted inside a standard pipe nipple N. FIG. 2 is a cross-sectional view taken along a line that is axial with the nipple N and also with the various parts of the invention that are shown in FIG. 1. In both figures the invention is shown in an orientation for use, in which the axial line is preferably within 5 degrees of a vertical or plumb line.

The nipple N may be of steel and include standard ¾-inch or 1-inch IPS pipe threads T at either end, for easy insertion into a natural gas line. The parts of the invention are held securely within the pipe nipple N by crimps C as shown in FIG. 1. The invention may also be incorporated into other pipe fittings that insert into a gas line, or it may be manufactured as a unit having means for connecting to a gas line built in, as for example to the lower body 40 or upper body 30.

Directly above the lowermost crimp C, a lower body 40 is disposed within the interior of the nipple. The body 40 is preferably molded of plastic material and includes a stop shoulder 47, against which a float 10 rests. (In FIG. 2, the float 10 is shown slightly elevated for clarity.) Also held within the nipple, by crimps C directly above the body 40, is a diffuser 30. The diffuser 30 includes an aperture defined by an internal surface 31 which has the general shape of a frustum of a cone. The apex of the cone is disposed above the diffuser 30 so that the diameter of the aperture increases with elevation (for easy separation of the diffuser from a mold during its formation). The diffuser 30 includes a shoulder 34 against which the upper end of the body 40 rests. The diffuser 30 is held within the nipple end by double crimps C, one directly above the diffuser 30 and one circumscribing the diffuser 30. A compressed area 36 in the outside surface of the diffuser 30 engages the crimp C for sealing.

The body 40 includes a cylindrical bore 41 within which the float 10 is free to move upwardly and downwardly through a height limited by the lower stop shoulder 47 of the lower body 40 and the upper stop shoulder 37 of the diffuser 30.

The upper body or diffuser 30 includes a lower step 34, while the lower body 40 includes an upper end or step 43. The steps 34 and 43 have mating surfaces, each an annulus. The lower and upper bodies 30 and 40 are joined into a single unit, preferably by spin-welding steps 34 and 43 after the float 10 has been inserted.

The float 10 is best shown in FIG. 1. The float 10 is preferably made of plastic, such as acetal resin or the like, and is unitary in construction. The uppermost portion of the float 10 is a conical nose 13, which acts to streamline gas flow and also ensures that the float 10 will enter the diffuser 30 aperture 31 concentrically in the event that a catastrophic loss of pressure downstream forces the float 1 upward. Directly below the conical part of the nose 13 is an annular groove 12, which resiliently accepts and holds an elastic O-ring 20, preferably formed of nitrile rubber or the like. (In FIG. 1 the O-ring 20 is shown exploded away from float 10 in an upward direction.) A short distance below the groove 12 of the nose is an annular stop shoulder 17. The stop shoulder 17 of the float 10 stops the motion of the float 10 by bearing on the shoulder 37 of the diffuser 30. This prevents the float 10 from jamming within the diffuser aperture 31, but allows the O-ring 20 to be fully inserted into the aperture 31.

Figure 3:
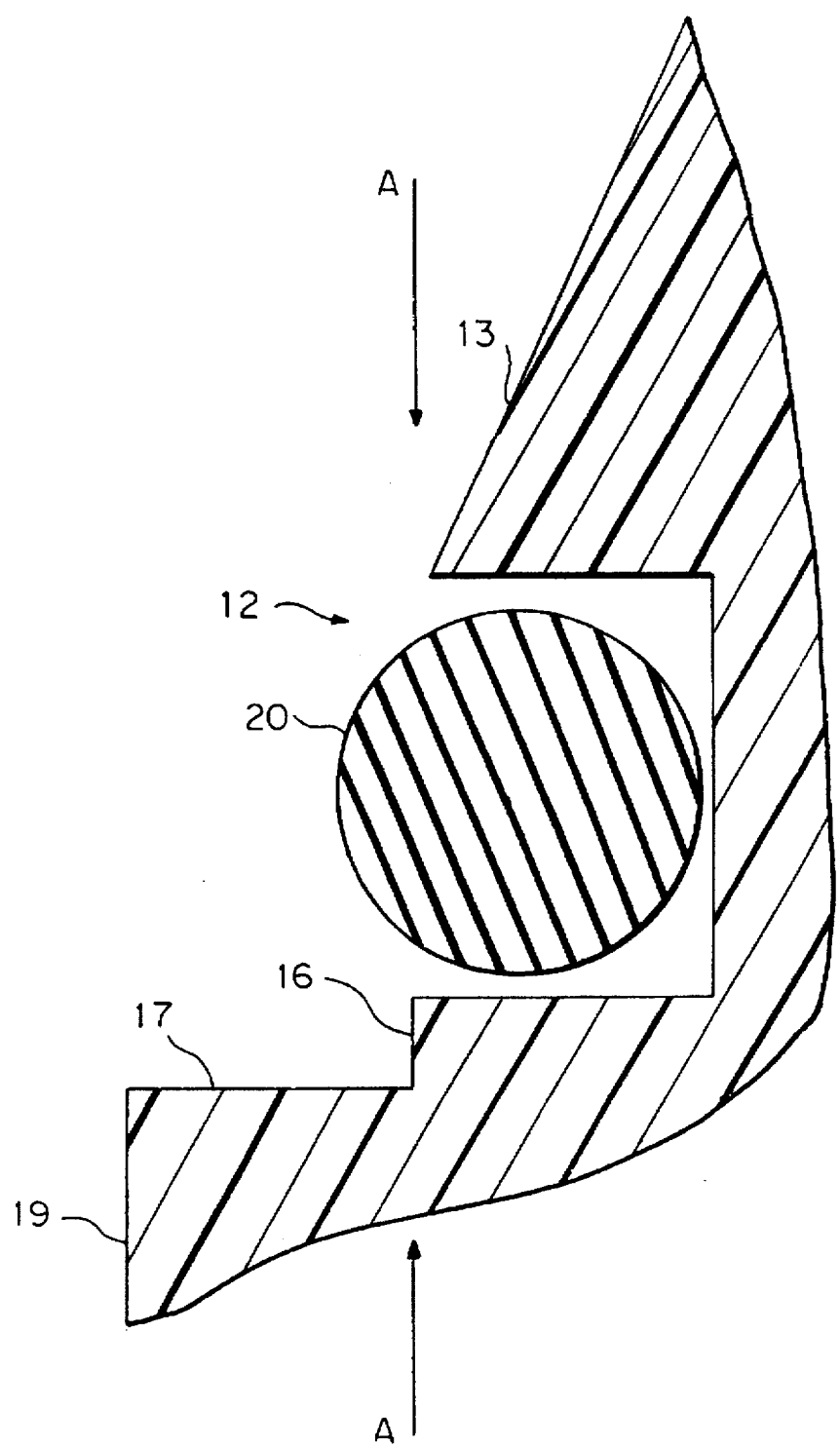
FIG. 3 is a detailed view according to FIG. 1, showing the float groove and O-ring in cross section.

FIG. 3, a detailed view according to FIG. 1, shows the nose 13, groove 12, stop shoulder 17, and orifice portion 19 of the float 10, with the O-ring 20 in the groove 12. As seen in FIG. 3, the conical taper of the nose 13 ends in an circular edge adjacent the circumferential groove 12. This circular edge coincides with the projection of a short cylindrical step 16 between the lower edge of the groove 12 and the stop shoulder 17, as indicated by the arrows A—A in FIG. 3. The diameter of the edge and the step 16 is only slightly less than the diameter of the aperture 31 at its lowermost point, so that when the nose 13 of the float 10 is fully inserted into the aperture 31 the O-ring 20 is compressed within the groove 12 by the surface 31, and seals tightly to prevent all gas flow upward.

The slight conical taper of the aperture surface 31 aids manufacturing if the diffuser 30 is molded.

Disposed underneath the stop shoulder 17 on the float 10 is a guide region 14, which includes four fins whose outer surfaces define portions of a cylindrical surface which has a diameter slightly less than the internal bore 41 of the body 40, so that the float 10 is held in vertical alignment within the bore but is able to freely slide up and down.

The flow shut-off valve of the present invention is intended to be installed downstream of the gas utility surface regulator and meter. It is preferably designed for use within pressures ranging from 5 inches of water up to 5 lbs. per square inch gauge, typically 7 to 11 inches of water. The invention is preferably also designed to shut off gas flow when the gas flow rate exceeds 325 to 400 cubic feet per hour. These pressures and flow rates are typical of gas conditions at the intended location of the present invention.

In the event of an earthquake or accident breaking lines downstream from the gas meter, the gas flow will exceed 325 to 400 cubic feet per hour because downstream appliances will no longer restrict the flow of gas. Once the maximum designed gas flow is exceeded, the float 10 will rise up and make a tight, preferably zero-leakage seal. However, if instead a slow leak (L in FIG. 2) is to be incorporated, then the valve may include such a leak by any conventional means, e.g. shoulder 17 may include a notch, the surfaces 17 and 37 may not mate closely enough to block all gas leakage, or the O-ring 20 may be removed.

The present invention is intended to operate in a vertical orientation only. The invention should be oriented within 10° of vertical for best results, preferably 5°, because the operation depends on gravity forces that act on the float 10. These forces are the weight of the float 10, which acts downward, and the buoyancy force on float 10, which acts upward. The sum of these two gravity forces must be balanced against the hydrostatic force caused by pressure drop across the float 10, which acts upward, and the gas velocity-dependent drag force, which also acts upward. The drag and pressure drop forces depend upon the geometry of the orifice portion 19 of float 10 in relation to the cylindrical internal bore 41, and also on the flow restriction due to the aperture 31. The pressure drop across the entire shut-off valve includes the drop across the float 10 and also through the aperture 31, so the size of the aperture 31 modifies the operation of the shut-off valve. The downward weight of the float 10 depends solely on the mass of the float 10. The upward force of buoyancy depends on the volume of the float 10 and also upon the density of the gas flowing within the gas line; because of this, the gas pressure (and hence density) has an effect on the closure of the flow shut-off valve. However, this effect is small because gas is light.

If a break in the line downstream from the nipple N causes loss of pressure on the upper end of the aperture 31, then the upward forces will exceed the downward forces, causing the float 10 to rise and partially block the aperture 31 of the diffuser 30. This will cause a still greater pressure difference to occur, and the full upstream line pressure will push the float 10 upward until the step shoulder is in contact with lower surface 37.

If the present invention is not oriented to a nearly vertical position, it will not function properly because both the buoyancy force and the weight of the float 10 will not be directed along the axis of the bore 41, while the fluid forces will continue to be directed along the axis. This will interfere with proper functioning because the forces will not add properly. As an extreme example, if the present invention were inverted the float 10 would rest on the shoulder 37 instead of the-shoulder 47, and it would not function even if the downstream gas pressure dropped to zero.

The nipple N may include a label bearing an arrow or other indicia of proper orientation.

As the invention is intended to function only in case of abnormally low downstream pressure, it is not important that the present invention reset itself. Consequently, there is no need for a small controlled leakage, which is required only where the flow limiting device is inaccessible and back pressure build-up must be used to reset the shut-off valve. The present invention is intended for installation in places that are readily accessible compared to a buried gas line.

Once the nipple N has been disconnected from downstream piping, the invention can be reset manually by inserting in the aperture 31 a long, thin object such as a pencil. To avoid damage, the eraser end should be used because a sharp object could damage the O-ring. If convenient, the present invention may also be reset without disassembling the nipple N from downstream pipes by creating back pressure with a source of compressed air or the like. Sufficient back pressure will pop the float 10 and O-ring 20 out of the aperture 31, resetting the shut-off valve for future use.

The valve is capable of passing gas either in a forward direction (upward in the drawing) or in an opposing reverse direction (down). In the forward direction the gas passes freely until a certain predetermined rate and/or pressure drop is exceeded, then the valve closes. The valve is spring-free, as it has no spring.

The foregoing description of the specific embodiments will so fully reveal the general nature of the invention that others can, by applying current knowledge, readily modify and/or adapt for various applications such specific embodiments, without departing from the generic concepts, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A gravity-responsive shut-off valve for limiting gas flow in a forward and upward direction when installed into a gas supply line in a vertical orientation, the valve comprising:

an integral and unitary float including an elongated downwardly pointing conical lower guide region comprising at least three vertically oriented fins integrally extending therefrom, an upper upwardly pointing conical nose, and an intermediate orifice region between said nose and said lower guide region, said intermediate orifice region including a short vertically extending cylindrical portion (19) having an upwardly facing horizontal stop shoulder (17);

a body open at a top end and a bottom end and including a generally cylindrical bore for containing the float, the bore slidably engaging the guide region for vertical movement of the float in the bore, the body further including a downwardly facing horizontal upper stop shoulder for stopping an upward motion of the float and for abutment against said upwardly facing horizontal stop shoulder (17), and a lower stop shoulder for stopping a downward motion of the float, said downwardly facing stop shoulder and said upwardly facing stop shoulder 17 to together constituting means for partially gas sealing against the upward flow of gas through said valve; and gas line connection means for leak-proof insertion of the body into the gas supply line;

said valve constituting means for regulating valve closing further comprising means for raising the float to stop the forward and upward flow of gas when the valve is connected into the gas supply line in a vertical orientation and when a predetermined certain pressure drop exists across the shut-off valve at a given inlet pressure with a predetermined certain flow rate in the forward and upward direction past the orifice region such that the float rises and the upwardly facing horizontal stop shoulder (17) abuts against the horizontal upper stop shoulder of the body to reduce an upward flow of gas through the shut-off valve to substantially less than the certain flow rate.

2. The shut-off valve according to claim 1, wherein the gas line connection means includes a pipe section in which the body is disposed.

3. The shut-off valve according to claim 2, wherein the pipe section includes selectively ¾-inch and 1-inch IPS pipe threads.

4. The shut-off valve according to claim 1, wherein said vertically oriented fins are radiating longitudinal fins, such that outer edges of the fins slidably engage the bore.

5. The shut-off valve according to claim 4, wherein the float further includes a tapering streamlined surface intermediate the fins, such that the float is tapered at upper and lower float ends.

6. The shut-off valve according to claim 1, wherein the valve trips at about 325–400 SCFH flowrate when a pressure drop across the shut-off valve is approximately 2–3 inches water column.

7. The shut-off valve according to claim 1, further comprising a circumferential groove disposed below said upper conical nose and above said upwardly facing horizontal stop shoulder (17), an elastic ring gasket disposed within the groove and extending radially outwardly, a vertical cylindrical valve seat extending upwardly from said downwardly facing horizontal upper stop shoulder of said body, and wherein the groove, the ring gasket and the valve seat surface are dimensioned such that the ring gasket may be compressed between the vertical cylindrical valve seat surface and the groove, thus comprising means for sealing the ring gasket against gas leakage.

8. The shut-off valve according to claim 7, wherein the elastic ring gasket is an O-ring.

9. The shut-off valve according to claim 7, wherein the valve trips at about 325–400 SCFH flowrate when a pressure drop across the shut-off valve is approximately 2–3 inches water column.

10. The shut-off valve according to claim 1, wherein the body includes a lower body and a diffuser upper body.

11. The shut-off valve according to claim 10, wherein the lower body and the upper body are spin-welded together.

12. The shut-off valve according to claim 1, wherein a weight of the float and dimensions of the shut-off valve are determined such that the shut-off valve, when vertically oriented, shuts when an absolute pressure of between 5 inches water column and 5 psi exists at the bottom end and a pressure difference of between 2 and 3 inches water column exists across the body.

13. The shut-off valve according to claim 1, further including automatic reset means for leaking gas at a small controlled rate when the shut-off valve is closed, such that the shut-off valve may be reset by pressure of leaked gas accumulating downstream of the shut-off valve, whereby the shut-off valve need not be manually reset.

14. The shut-off valve according to claim 1, wherein the valve is spring-free.

15. A gas supply line shut-off valve comprising:

a float including a lower guide region, an intermediate orifice region, and an upper nose;

a body open at a top end and a bottom end and including a generally cylindrical bore for containing the float, the bore slidably engaging the guide region, the body further including an upper stop shoulder for stopping an upward motion of the float, and a lower stop shoulder for stopping a downward motion of the float, and a valve seat surface for gas sealing against the nose; and gas line connection means for leak-proof insertion of the body into the gas supply line;

whereby the shut-off valve may be connected into the gas supply line in a vertical orientation such that, when a certain pressure drop exists across the shut-off valve with a pressure greater below at a certain flow rate, the float may rise and the nose seal against the valve seat surface to stop an upward flow of gas through the shut-off valve;

wherein the gas line connection means includes a pipe section in which the body is disposed; and wherein the pipe section is crimped to fix the body within the section.

16. The shut-off valve according to claim 15, wherein the pipe section includes at least one of an upper crimp proximal the top end of the body and a lower crimp proximal the bottom end of the body.

17. A method of protecting against spilling gas from a ruptured gas line downstream of a gas meter, during and immediately following an earthquake, comprising:

providing a gas shut-off safety valve in a vertical section of a gas supply pipe located within or outside a building downstream of a gas meter, said gas shut-off safety valve including a unitary float including a lower guide region comprising a gas-guiding portion having a downwardly pointing conical shape and at least three vertically oriented radial fins integrally extending outwardly from said conical gas-guiding portion, an intermediate orifice region, and an upper nose, a body open at a top end and a bottom end and including a generally cylindrical bore for containing the float, the bore slidably engaging said fins of the guide region, the body further including an upper stop shoulder for stopping an upward motion of the float, and a lower stop shoulder for stopping a downward motion of the float, said valve comprising means responsive to a drop in gas pressure downstream thereof for closing said valve by upward vertical movement of said float and at least partial sealing of said float against said upper stop shoulder.

18. A method of protecting against spilling gas from a ruptured gas line during and immediately following an earthquake, comprising:

providing a gas shut-off safety valve in a vertical section of gas supply pipe located within or outside a building downstream of a gas meter, said gas shut-off safety valve comprising a float including a lower guide region, an intermediate orifice region, and an upper nose, a body open at a top end and a bottom end and including a generally cylindrical bore for containing the float, the bore slidably engaging the guide region, the body further including an upper stop shoulder for stopping an upward motion of the float, and a lower stop shoulder for stopping a downward motion of the float, said valve comprisinq means responsive to a drop in gas pressure downstream thereof for closing said valve by upward vertical movement of said float and at least partial sealing of said float against said upper stop shoulder, wherein the step of providing the valve comprises providing such a valve with automatic reset means for leaking gas at a small controlled rate when the safety valve is closed, such that the safety valve may be reset by pressure of leaked gas accumulating downstream of the safety valve, whereby the safety valve need not be manually reset.

19. In a gas supply line in an earthquake prone area, said gas supply line leading from a mains gas supply source and including a vertical section of pipe located within or outside a building downstream of a gas meter, the improvement wherein said vertical section of pipe contains a gas shut-off safety valve which constitutes means for limiting gas flow in a downstream and upward direction when there is a break downstream therefrom, said gas shut-off safety valve being disposed in said vertical section of pipe in a vertical orientation and comprising:

a body open at a top end and a bottom end and having an internal bore wall defining a vertically oriented and generally cylindrical bore;

a unitary gravity-responsive float including a lower guide region comprising a gas-guiding portion having a downwardly pointing conical shape and at least three vertically oriented radial fins integrally extending outwardly from said conical gas-guiding portion, an upper region having an upwardly pointing conical configuration, and an intermediate orifice region between said lower guide region and said upper region, said intermediate orifice region having an upwardly facing stop shoulder (17), said unitary float being vertically movable within said bore with distal edges of said radial fins being closely adjacent said bore wall;

said body further including an upper downwardly facing stop shoulder in facing relationship with said upwardly facing stop shoulder (17), and a lower stop shoulder for stopping a downward motion of said float;

said valve comprising means responsive to a drop in gas pressure downstream thereof for at least partially closing said valve by upward vertical movement of said float with said upwardly facing stop shoulder (17) of said float coming into direct contact with said upper downwardly facing stop shoulder of said body.

20. The gas supply line according to claim 19, wherein the vertical section is disposed outside a foundation wall of a building.

21. The gas supply line according to claim 19, wherein the vertical section comprises a pipe nipple.

22. A gas supply line according to claim 19 wherein, in said gas shut-off safety valve, said upwardly facing stop shoulder (17) of said float is horizontal, and said upper downwardly facing stop shoulder of said body is also horizontal.

23. The shut-off valve according to claim 1, wherein the certain flow rate is between about 325 to 400 ft$^3$/hr.

* * * * *